US008306838B2

(12) United States Patent
Heise et al.

(10) Patent No.: US 8,306,838 B2
(45) Date of Patent: Nov. 6, 2012

(54) SYSTEM AND METHOD FOR AFFIRMATIVE FULFILLMENT OF AN ORDER BASED ON SAME DAY MATERIAL AVAILABILITY DURING OPERATING HOURS

(75) Inventors: Torsten Heise, Wiesloch (DE); Wolfram Schick, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 1298 days.

(21) Appl. No.: 11/848,122

(22) Filed: Aug. 30, 2007

(65) Prior Publication Data
US 2009/0063215 A1 Mar. 5, 2009

(51) Int. Cl.
*G06Q 10/00* (2012.01)
(52) U.S. Cl. ...................................................... 705/7.12
(58) Field of Classification Search .................. 705/7.12
See application file for complete search history.

(56) References Cited

U.S. PATENT DOCUMENTS

| | | | | |
|---|---|---|---|---|
| 5,809,479 | A * | 9/1998 | Martin et al. ................ | 705/7.24 |
| 6,167,320 | A * | 12/2000 | Powell ............................ | 700/95 |
| 6,701,299 | B2 * | 3/2004 | Kraisser et al. .............. | 705/7.12 |
| 6,801,901 | B1 * | 10/2004 | Ng .................................. | 705/28 |
| 6,929,181 | B1 * | 8/2005 | Oswalt ......................... | 235/385 |
| 6,963,847 | B1 * | 11/2005 | Kennedy et al. .................. | 705/8 |
| 7,035,856 | B1 * | 4/2006 | Morimoto ............................. | 1/1 |
| 7,043,320 | B1 * | 5/2006 | Roumeliotis et al. .......... | 700/100 |
| 7,050,995 | B2 * | 5/2006 | Wojcik et al. ................... | 705/28 |
| 7,092,775 | B2 * | 8/2006 | Nomoto et al. ................. | 700/97 |
| 7,249,044 | B2 * | 7/2007 | Kumar et al. ...................... | 705/8 |
| 7,313,534 | B2 * | 12/2007 | Scheer .............................. | 705/9 |
| 7,373,212 | B2 * | 5/2008 | Lokowandt ................... | 700/101 |
| 7,424,448 | B2 * | 9/2008 | Fuchs et al. ..................... | 705/26 |
| 7,496,520 | B1 * | 2/2009 | Handel et al. ................. | 705/320 |
| 7,536,321 | B2 * | 5/2009 | Takahashi et al. ............. | 705/330 |
| 7,610,212 | B2 * | 10/2009 | Klett et al. ......................... | 705/8 |
| 7,620,571 | B2 * | 11/2009 | Gieselmann et al. ......... | 705/26.5 |
| 7,693,594 | B2 * | 4/2010 | von Helmolt et al. ......... | 700/100 |
| 7,827,051 | B2 * | 11/2010 | Sanchez et al. .................... | 705/7 |
| 7,840,606 | B2 * | 11/2010 | Glebe .......................... | 707/803 |
| 7,966,207 | B2 * | 6/2011 | Altice et al. ................. | 705/7.11 |
| 7,987,107 | B2 * | 7/2011 | Wilson et al. ................ | 705/7.12 |

(Continued)

FOREIGN PATENT DOCUMENTS

DE EP1619593 A1 * 1/2006

(Continued)

OTHER PUBLICATIONS

Knolmayer, G. et al., Supply Chain Management Based on SAP Systems—Order Management in Manufacturing Companies Springer, 2002.*

(Continued)

*Primary Examiner* — Scott L Jarrett
(74) *Attorney, Agent, or Firm* — Blakely, Skoloff, Taylor & Zafman LLP

(57) ABSTRACT

Embodiments of the invention include a system and process that manages scheduling and processing of orders to provide improved delivery schedules. The system attempts to schedule package deliveries in time to meet a requested delivery target time and date. This scheduling attempts to schedule a shipping time for the current day to meet next day or nearer term deadlines. The scheduling system examines schedules and shipping locations that are not optimal for minimizing costs, but provide more timely delivery including examining locations other that a facing location for shipment.

10 Claims, 7 Drawing Sheets

U.S. PATENT DOCUMENTS

| | | | |
|---|---|---|---|
| 8,069,086 B2 * | 11/2011 | von Helmolt et al. | 705/26.81 |
| 2001/0042023 A1 * | 11/2001 | Anderson et al. | 705/26 |
| 2002/0019759 A1 * | 2/2002 | Arunapuram et al. | 705/7 |
| 2002/0095307 A1 * | 7/2002 | Greamo et al. | 705/1 |
| 2003/0036938 A1 * | 2/2003 | Dutta et al. | 705/8 |
| 2003/0093388 A1 * | 5/2003 | Albright | 705/400 |
| 2004/0030572 A1 * | 2/2004 | Campbell et al. | 705/1 |
| 2004/0054570 A1 * | 3/2004 | Streetman | 705/8 |
| 2005/0165629 A1 * | 7/2005 | Bruns | 705/6 |
| 2005/0228705 A1 * | 10/2005 | Irwin | 705/8 |
| 2006/0041481 A1 * | 2/2006 | Stowe | 705/16 |
| 2006/0224423 A1 * | 10/2006 | Sun et al. | 705/7 |
| 2006/0224426 A1 * | 10/2006 | Goossens et al. | 705/8 |
| 2006/0265234 A1 * | 11/2006 | Peterkofsky et al. | 705/1 |
| 2007/0129964 A1 * | 6/2007 | Helmolt et al. | 705/1 |
| 2007/0192191 A1 * | 8/2007 | Neal et al. | 705/14 |
| 2008/0126164 A1 * | 5/2008 | Jaeck | 705/8 |
| 2008/0154414 A1 * | 6/2008 | Lokowandt et al. | 700/107 |
| 2009/0048878 A1 * | 2/2009 | Metcalf | 705/5 |

FOREIGN PATENT DOCUMENTS

DE      EP1628251 A1 *   2/2006

OTHER PUBLICATIONS

Dickersbach, Jorg Thomas, Supply Chain Managemetn with AP0 Springer, 2005.*

* cited by examiner

SYSTEM AND METHOD FOR AFFIRMATIVE FULFILLMENT OF AN ORDER BASED ON SAME DAY MATERIAL AVAILABILITY DURING OPERATING HOURS

BACKGROUND

1. Field of the Invention

The invention relates to the scheduling of order documents in a supply chain management system. Specifically, the embodiments of the invention relate to method and system for determining a delivery schedule that prefers complying with a requested deliver date and a shipping facility able to process the request on the same day over the use of a facing location.

2. Background

An order for a product by a customer is scheduled by the shipping company. The shipping company utilizes supply chain management software to guide this process. The supply chain management software schedules the shipping of the good and determines a shipping location and route based on minimizing a cost to the shipper. Minimizing the cost is achieved by determining a facing location from which to ship the product. A facing location is a preferred shipping location for a given destination. The facing location is typically selected based on geographical proximity or available shipping routes between the shipping location and the end destination.

A customer may be presented with shipping options such as one day or two day delivery. However, these services are based on processing the order within the operating hours of the facing location or the day after receiving the order. If the facing location has closed for the day then the shipping option is measured from the next time that the facing location has operating hours. For example, if a facing location has operating hours between 8 A.M. and 6 P.M. on Monday through Friday, but an order is received at 7 P.M. on Friday for two-day delivery, then the two-day delivery will be measured from the next operating day. In this example, the next operating data is Monday. So the two-day shipping is determined from Monday, when the order is processed. As a result, the ordered product is likely to arrive on Wednesday, which is two days after the order was received on Monday, but five days from when it was placed on Friday.

SUMMARY

Embodiments of the invention include a system and process that manages scheduling and processing of orders to provide improved delivery schedules. The system attempts to schedule package deliveries on the day they were received and in time to meet a requested delivery target time and date. This scheduling attempts to schedule a shipping time for the current day to meet next day or nearer term deadlines. The scheduling system examines schedules and shipping locations that are not optimal for minimizing costs, but provide more timely delivery including examining locations other than a facing location for fulfillment of an order.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
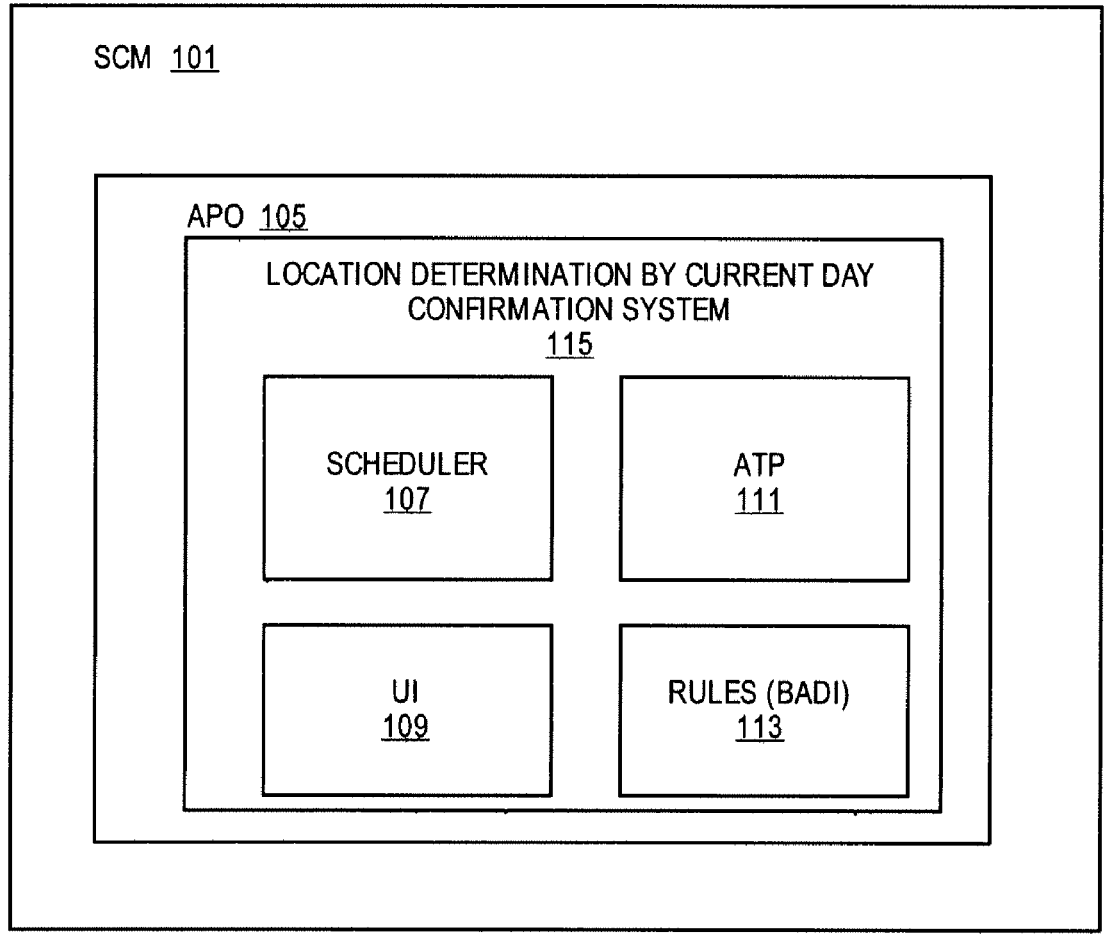
FIG. 1 is a diagram of a system for location determination by current day confirmation.

FIG. 1 is a diagram of a system for location determination by current day confirmation. In one example embodiment, the location determination by current day confirmation system is implemented as a set of components in a supply chain management (SCM) system 101. A 'set,' as used herein, refers to any whole number of items including one item. The supply chain management system can be any SCM system including SAP SCM by SAP AG of Walldorf, Germany or similar SCM systems. The SCM system 101 is an platform, application or suite of applications that facilitate the management of products and resources in a supply chain.

The SCM system 101 can include any number of applications or modules that relate to the management of a supply chain. The programs can include an advance planning and organization (APO) module 105 and/or a set of modules that provide the functionality of a location determination by current day confirmation system 115. The placement of the location determination by current day confirmation system 115 in an APO module 105 of a SCM system 101 is one example environment for the implementation and use of the location determination system 115. One skilled in the art would understand that the location determination system 115 can be implemented or utilized in other SCM or enterprise resource planning (ERP) systems and modules and in similar systems or as a separate tool for scheduling orders.

In one embodiment, the location determination system 115 includes a scheduler 107, available to promise (ATP) module 111, user interface 109, business rules 113 and similar components. The scheduler 107, ATP module 111, user interface 109 and business rules 113 work in combination to provide the location determination system 115. The scheduler 107 generates a schedule based on product related information that determines a material availability date (MAD) and delivery date (DD) amongst other relevant dates. The ATP module 111 determines the availability of a product at a warehouse, manufacturing plant or similar shipping location or facility. The ATP module 111 draws from scheduling and production information in the SCM 101 and APO 105 to determine when a product will be produced and ready for shipping. The rules 113 may be a business add-in (BAdI) rules or a similar set of additional rules that define the criteria for selecting a shipping location and are accessed and applied by the scheduler 107 and ATP modules 111. The user interface module 109 is a basic user interface that provides a graphical or text based interface that allows a user or system administrator to interact with or monitor the location determination system 115.

Figure 2:
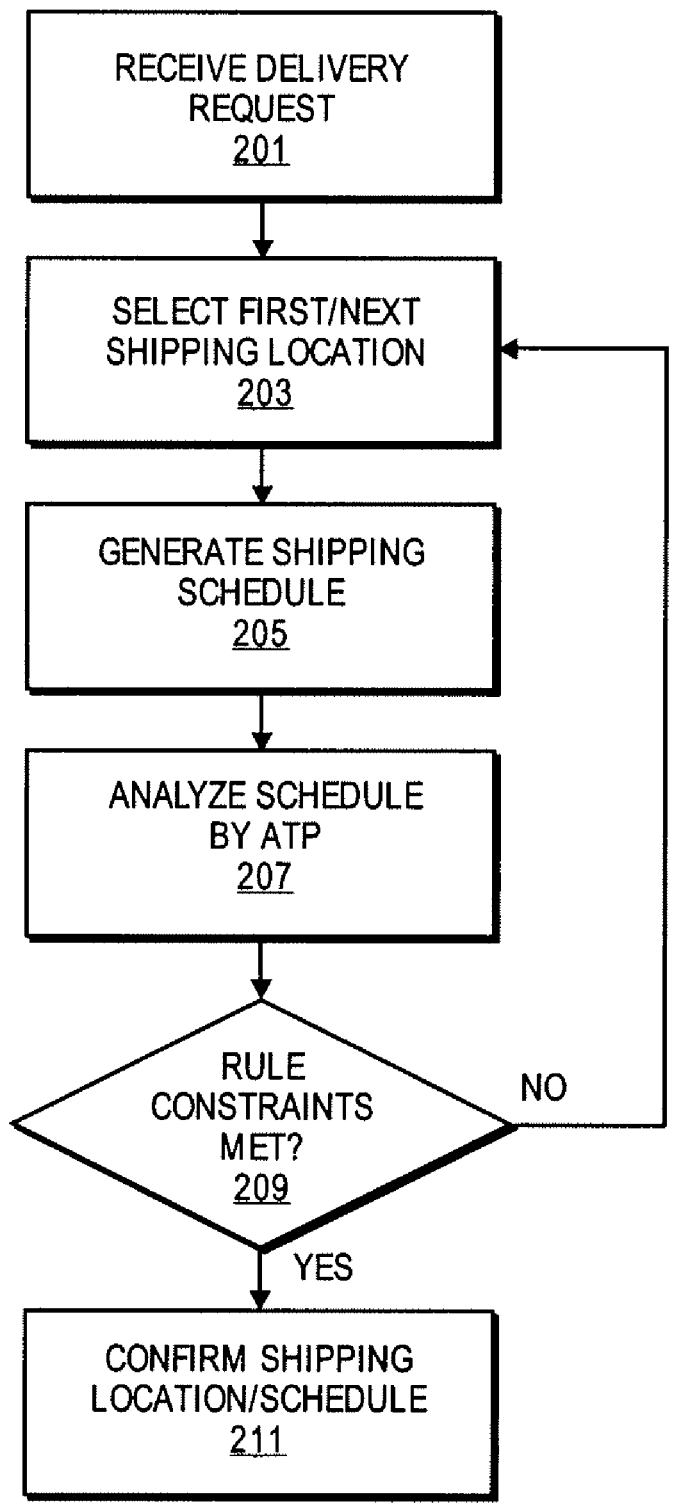
FIG. 2 is a flowchart of one embodiment of a process for determining a shipping location.

FIG. 2 is a flowchart of one embodiment of a process for determining a shipping location. This process is initiated by the APO or similar component in response to receiving an order for a product. The incoming order includes a request for delivery on a specific date and may also include a specific time (block 201). The specific time and date are designated by the customer or entity that is placing the order. In this case, the customer is typically not concerned with minimizing the cost of shipping the ordered products or set of products. Thus, the customer has a rush or emergency context in which it desires to have its requested delivery time and date honored as a priority over the cost of the shipping. Besides meeting the requested delivery date the process attempt to confirm the handling of the order on the same day as it is received, thereby giving the customer the best possible delivery schedule absent meeting the specified delivery date.

The shipping location determination process starts with a first shipping location for analysis (block 203). In one embodiment, the first shipping location is the facing or preferred location that may be selected based on geographical proximity to the shipping destination or similar criteria that minimize the shipping costs. The first location may be selected based on any criteria selected by the administrator of the system including proximity, cost, operating hours and similar criteria or any combination thereof. In one embodiment, the process iterates through shipping locations until a shipping location is found that meets the requirements of a customer. In another embodiment, multiple locations are evaluated in parallel and the results are compared to select an optimal solution. For example, if multiple locations are able to fulfill the customer's criteria then the shipper's criteria are evaluated, such as the lowest shipping cost, to find an optimal location. In a further embodiment, an order of shipping locations to analyze is specified based on any criteria or preferences.

For each shipping location selected for analysis a schedule is calculated (block 205). The schedule is a timetable of actions that occur in the process of delivering an order. An example schedule is described below in regard to FIG. 4. The schedule is calculated to meet the requested delivery date specified by a customer. The calculation of the schedule is based on meeting the constraints of the order, specifically the requested delivery date. The schedule may be determined using any scheduling algorithm.

The schedule is then analyzed in conjunction with the ATP module (block 207). Availability of products, transportation, operating hours of shipping facilities and similar information is determined and compared to the schedule. A schedule may be shifted or altered to fit the characteristics of the location under consideration. A set of defined rules are employed to determine whether the schedule or an alteration of the schedule can be determined that meets the requirements of the ordering customer. Example applications of these rules are presented below in the description related to FIG. 3, FIGS. 5A-C and FIGS. 6A and B. Each of the stages of the schedule is examined in light of the collected information to determine if it is possible to meet the requirements for each stage (block 209). For example, a schedule includes a material availability date (MAD). The material availability date is the date that the ordered product is available at a shipping location. The MAD becomes a requirement for analysis purposes. If the MAD cannot be met then the location cannot meet the requirements of the order and the next location is selected for analysis (block 203). If the requirements of an order are met, then the shipping location is confirmed as the location for fulfilling the customer order (block 211).

In one embodiment, the applicable rules for determining whether a shipping location meets the requirements of an order are implemented as set of BAdI rules. The requirements of each order are mapped onto the appropriate BAdI rules and these rules set forth a set of constraints that a location must fall within to satisfy the BAdI rule.

Figure 3:
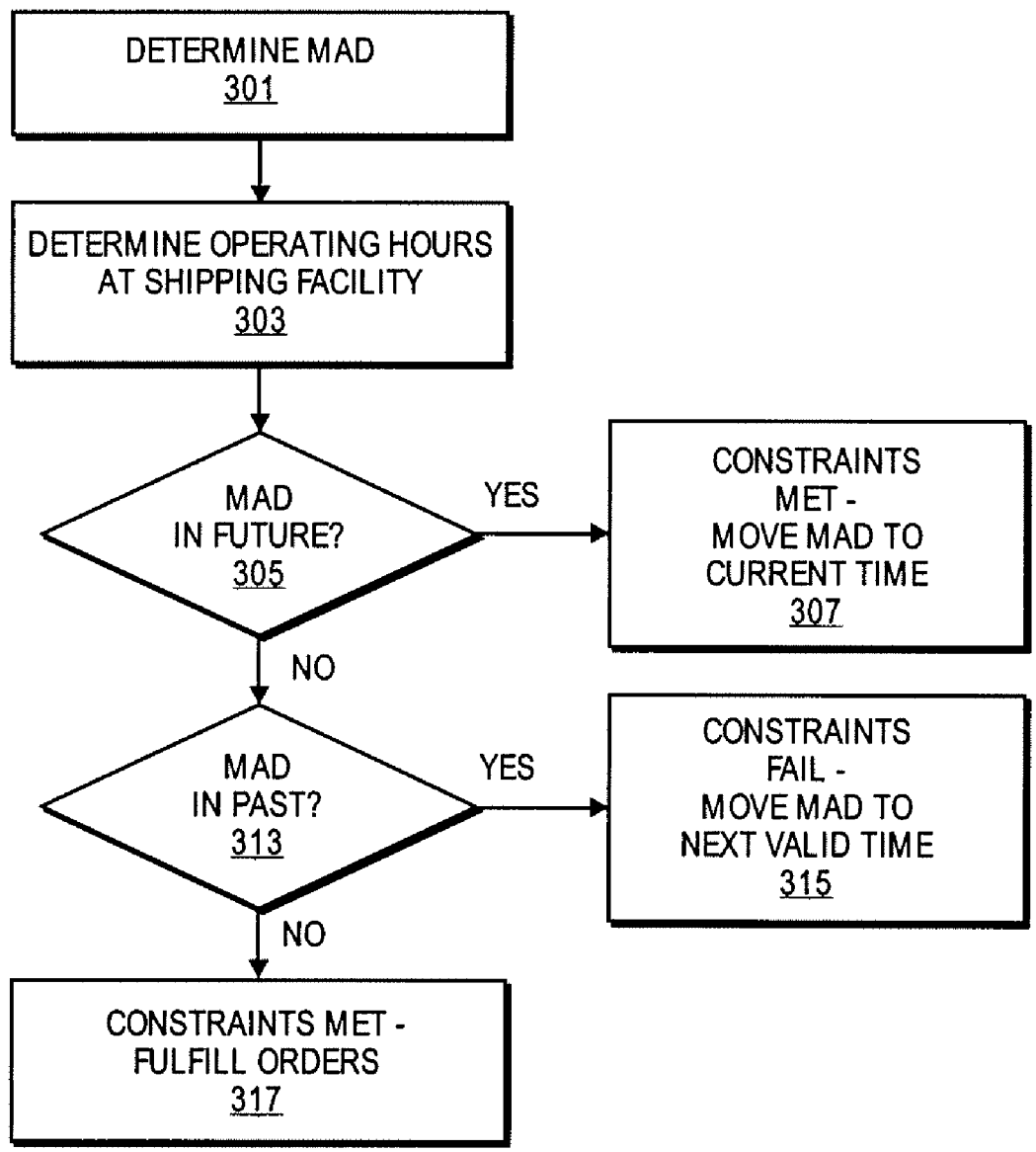
FIG. 3 is a flowchart of one embodiment of a process for meeting a shipping delivery date constraint.

FIG. 3 is a flowchart of one embodiment of a process for meeting a shipping delivery date constraint. This process is part of the analysis of a shipping location to determine whether a customer order can be fulfilled from the location based on the requirements of the order. This process receives a schedule generated based on the order's requested delivery date. The process is called to evaluate the schedule and accesses the schedule to determine each of the required schedule dates (block 301). For sake of clarity, the determination and check of the material availability date (MAD) is discussed. Specifically, the MAD that is necessary to meet a requested delivery date (RDD). The MAD must precede the RDD by a length of time determined by the schedule. This MAD is referred to herein as the requested MAD (RMAD). The actual MAD may vary if the product is available before or after the RMAD. One skilled in the art would understand that each or any one of the schedule dates can be checked according to the same principles and procedures.

After receiving the schedule and determining the RMAD, the process then determines the operating hours and calendar of the shipping location facilities (block 303). This data may be accessed from any component or data storage in communication with the system. The operating hours and calendar of the shipping location facilities determine their ability to ship or start the processing of an order. If the facilities are closed, then they cannot start processing the order until the next work day. The current time and date is compared with the operating hours of the facility. If the facility is closed, then a current time value is set to the next operating time of the facility, this being the effective current time in regard to processing the order. If the facility is open, then the current time value is set to the real world current time. In another embodiment, instead of adjusting the current time at this stage of the analysis, an adjusted MAD (AMAD) is set to the next operating time or the current time respectively. The AMAD can then be compared to the RMAD to determine if it is possible to meet the RMAD constraint.

The process then compares the RMAD with the current time value to determine if the RMAD is at a point of time after the current time value (block 305). If the RMAD is at a point in time in the future, in comparison to the current time value, then the RMAD requirement is met (block 307). If all other constraints for a location are met then it can be confirmed as a shipping location that is capable of fulfilling the customer order. The schedule can be adjusted such that RMAD is the current time value or near to the current time value thereby moving the actual deliver date to a time before the RDD to ensure that the requested delivery is fulfilled by the RDD. This scenario is further described in relation to FIG. 5A and is a successful application of the rules to fulfill the rush customer order.

If the RMAD is not in the future, then the RMAD is compared with the current time value to determine if the RMAD precedes the current time value (block 313). If the RMAD does precede the current time value, i.e., the RMAD has already passed and cannot be met, then the RMAD is moved to the current real time by setting the current time value to the current real time or a real time after that point in time that is within the operating hours and calendar of the shipping location facilities (block 315). In this scenario, the application of the rules has failed to find an acceptable schedule to meet the requested delivery date. However, the AMAD can be used in further evaluation if, for example, no location is able to meet the RMAD constraint then the AMAD from this shipping location can be evaluated for use.

If the RMAD is not in the past or future (e.g., the RMAD specifies the current date, but not a specific time), then the constraints of the RMAD are met and the order can be processed if other constraints are met (block 317). In this scenario, the schedule can be used 'as is' and the RMAD is utilized as the actual MAD, and the constraints of the rules are successfully met to meet the RMAD.

Figure 4:
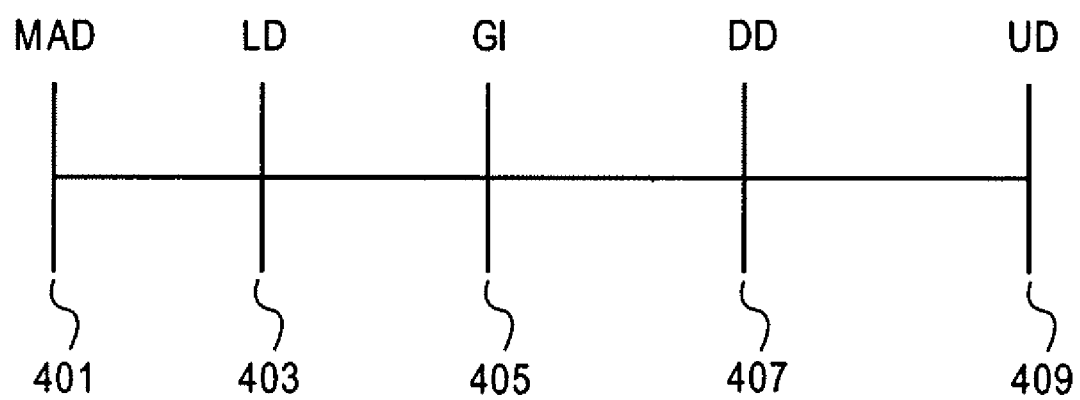
FIG. 4 is a diagram of one embodiment of a shipping schedule.

FIG. 4 is a diagram of one example embodiment of a shipping schedule. The example schedule sets forth the key events or stages in the processing of a customer order. The degree of precision in the schedule can vary dependent on the available data, administrator configuration and similar considerations. The events can be fixed at months, days, hours, minutes, seconds or similar levels of granularity in time. The number of stages that can be compressed or expanded depends on the degree of detail desired in formulating the schedule. For example, a schedule can be reduced to a material availability date and requested delivery date, in some situations, while in others the schedule may be expanded to include more information about intermediate shipping points, warehouse management and similar events.

The first event in the example schedule is the material availability date (MAD) 401. The material availability date is the time at which the product in an order becomes available for shipping. This may be the time that the product is manufactured, delivered to a warehouse, stocked at a facility or similarly becomes available to be shipped to a customer. The MAD indicates the start of the shipping process. After the product becomes available, then it becomes possible to determine and confirm scheduling of the other events leading up to the delivery date.

The next event in the example schedule is the loading date (LD) 403. The LD 403 is the time at which the product is loaded onto the first transport at the shipping facility. For example, the product may be loaded onto a truck at the warehouse. The LD 403 can be calculated based on information about the availability of the transport for the shipment of products to the end destination or an intermediate destination, availability of loaders at the warehouse or based on similar information.

The next event after the LD is the goods issuance (GI) date 405. The GI date 405 is the time at which the transport carrying the product leaves the shipping facility. The GI date 405 can be calculated based on transportation schedules, capacity of the transports, other orders to be placed on the transports and similar information. For example, a transport may have a schedule to leave the shipping facility on a specific day or upon being filled to capacity.

The next event after the GI date is the delivery date (DD) 407. The DD 407 is the time at which a transport carrying the requested product arrives at the destination location. The product may be transported on any number of transports between leaving the shipping facility and arriving at the destination location. The DD can be calculated based on the transportation schedule for the product including travel time and transfer times for each segment of the transportation schedule.

The next event after the delivery date is the unload date (UD) 409. The UD 409 is the time at which a transport carrying the requested product is unloaded at the destination location. The product may arrive on a transport at a time when the destination facility is not operating. The product can not be unloaded until the facility opens. For example, the product can be on a truck that arrives after the destination location facility has closed for the day. The truck will not be unloaded until the next work day.

Figure 5A:
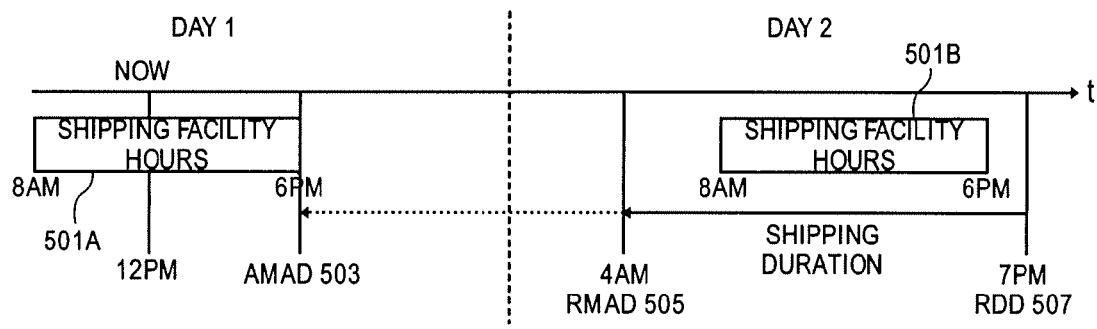
FIGS. 5A-C are diagrams of example embodiments of shipping rules for a facing location.
Figure 5B:
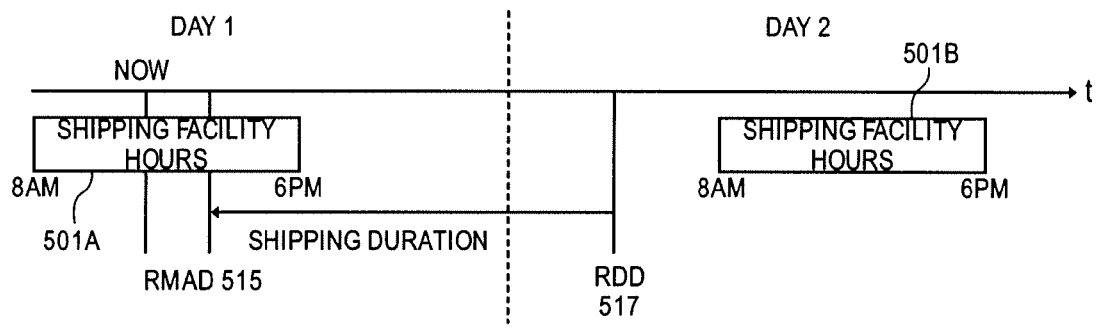
Figure 5C:
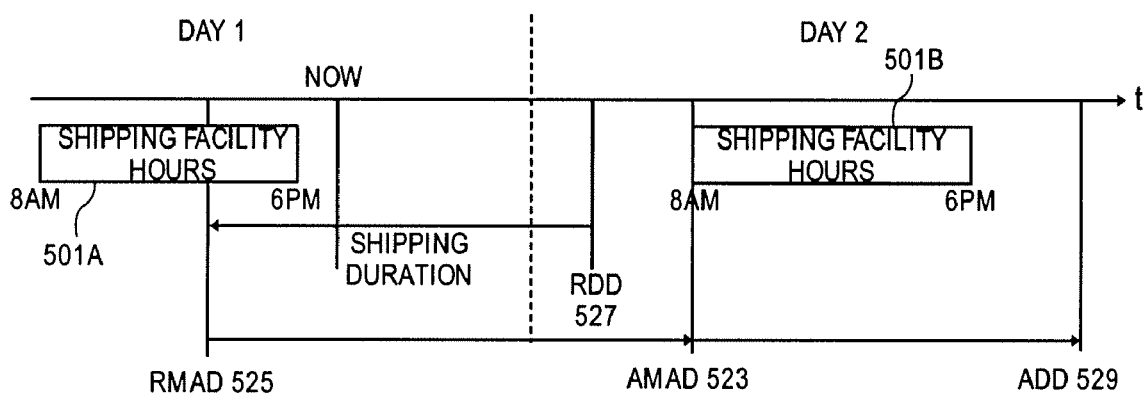

FIGS. 5A-C are diagrams of embodiments of the example application of shipping rules for a first location. The first location may be the first location analyzed by the algorithm such as a facing location. The first location can be selected based on any criteria.

FIG. 5A is a diagram of one example scenario of the analysis of a first shipping location. In the example, the shipping facility, e.g., a warehouse, production plant or similar location, has operating hours from 8 A.M. to 6 P.M. 501A, B each day. An RDD 507 has been received for an order that is at 7 P.M. on day 2 (e.g., the next day). A schedule has been generated that requires that the requested material availability date (RMAD) 505 is 4 A.M. on day 2. The current real time is 12 P.M. on day 1. Thus, the RMAD 505 is well into the future at this level of precision, i.e., days and hours. The RMAD 505 can be adjusted to any time after the current real time on day 1 that is within the operating hours 501A of the shipping facility. The RMAD 505 can be adjusted, for example, to 6 P.M. on day 1. The duration of time between the MAD and DD is fixed so that the adjustment in the RMAD results in a adjusted DD that is well in advance of the RDD 507. Accordingly, the process has successfully met the shipping constraints set by the customer order and the location determination process does not need to further analyze other locations.

FIG. 5B is a diagram of one example scenario of the analysis of the first shipping location. In the example, the shipping facility again has operating hours from 8 A.M. to 6 P.M. each day 501A, B. An RDD 517 has been received for an order that is at 4 A.M. on day 2. A schedule has been generated that requires that the RMAD 515 is 2 P.M. on day 1. The current real time is 12 P.M. on day 1. Thus, the RMAD 515 is at or near the current real time, is within the operating hours of the shipping facility and can be accepted or confirmed for processing. The RMAD 515 does not need to be adjusted as it is near the current real time. Accordingly, the process has successfully met the shipping constraints set by the customer order and the location determination process does not need to further analyze other locations.

FIG. 5C is a diagram of one example scenario of the analysis of the first shipping location. In the example, the shipping facility again has operating hours from 8 A.M. to 6 P.M. each day 501 A, B. An RDD 527 has been received from an order that is at 2 A.M. on day 2. A schedule has been generated that requires that the RMAD 525 is at 4 P.M. on day 1. However, the current real time is after 6 P.M. on day 1 and the facility is not operating. Thus, it is not possible to fulfill the RMAD 525, because the RMAD 525 is in the past. Consequently, it is not possible to fulfill the RDD 527 and the rule has failed. Another location will subsequently be evaluated to attempt to fulfill the RDD 527.

In another embodiment, the MAD is adjusted to the next possible MAD or AMAD 523. The AMAD 523 is at the start of the next day during operating hours of the shipping facility on day 2. The AMAD 523 is then used to calculate an adjusted delivery date (ADD) 529. The ADD 529 can be used for comparison with other locations to determine a best location if no location can be found to fulfill the RDD 527.

Figure 6A:
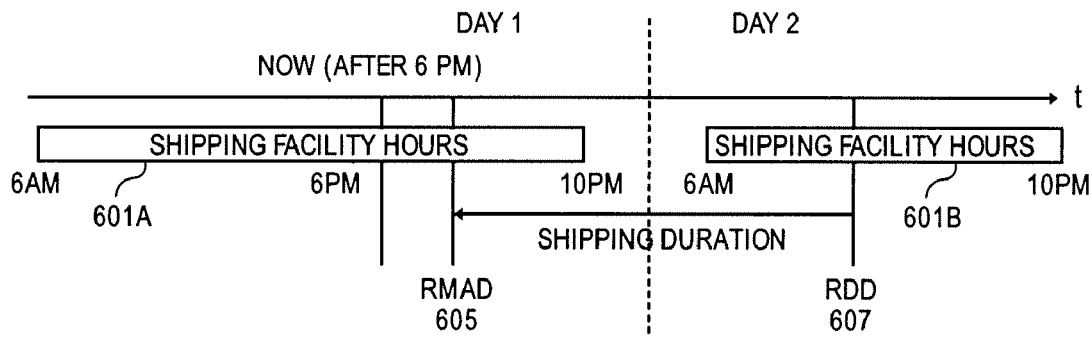
FIGS. 6A and B are diagrams of one embodiment of shipping rules for a secondary location.

FIGS. 6A and B are diagrams of example embodiments of shipping rules for a secondary location. Secondary locations (or any subsequently analyzed location) can be selected based on any criteria including proximity, shipping costs, product availability and similar criteria. For example, the secondary location may have longer operating hours than a first or facing location or may be in a different time zone.

FIG. 6A is a diagram of one example scenario of the analysis of the secondary shipping location. In the example, the secondary shipping facility has expanded operating hours 601A, B from 6 A.M. to 10 P.M. each day. An RDD 607 has been received from an order that is at 10 A.M. on day 2. A schedule has been generated that requires that the RMAD 605 to be at 8 P.M. on day 1. The current real time is after 6 P.M. on day 1, but the facility is still operating (while a facing facility may have closed at 6 pm). Thus, it is possible to fulfill the RMAD 605, because the RMAD 605 is not in the past and falls within the working hours of the facility. Consequently, it is possible to fulfill the RDD 607 and the rule is successful.

Figure 6B:
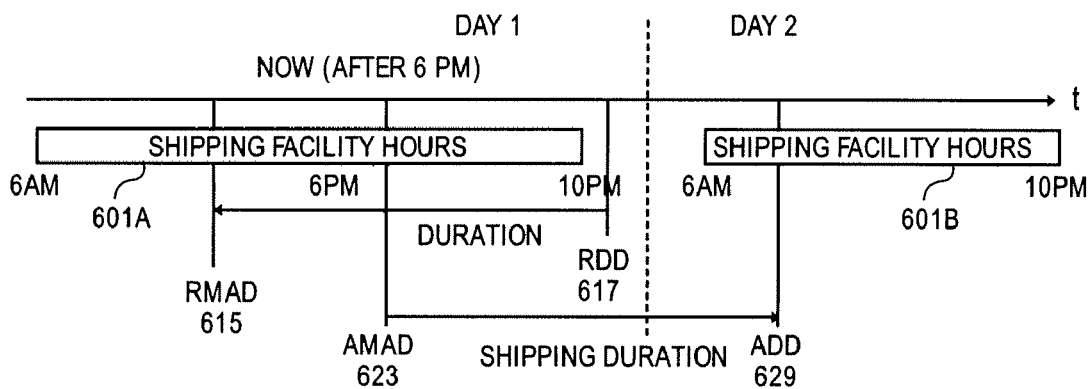

FIG. 6B is a diagram of one embodiment of the analysis of a secondary shipping location. In the example, the secondary shipping facility again has expanded operating hours 601 A,B from 6 A.M. to 10 P.M. each day. A RDD 617 has been received from an order that is at 11 P.M. on day 1. A schedule has been generated that requires that the RMAD 615 is at 12 P.M. on day 1. The current real time is after 6 P.M. on day 1. Even though the facility is still operating it is not possible to meet the RDD 617, because the RMAD 615 is in the past.

In some embodiments, the constraints of the order may be flexible, such that so long as it is processed on the same day it is acceptable to the customer. In such an embodiment and for purposes of comparison with other locations for best effort type delivery, then the MAD is moved to the current time to generate an AMAD 623. The ADD 629 is then generated by shifting the schedule. The AMAD 623 and ADD 629 can be used if the constraints require only same day processing or if the adjusted schedule is the best available schedule from an analysis of the available shipping locations.

In one embodiment, the location determination management system may be implemented as hardware devices. In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A machine readable medium, having instructions stored therein, which when executed cause the machine to perform a set of operations, comprising:
   receiving an order having a requested delivery date;
   selecting a plurality of possible shipping locations;
   calculating a shipping schedule to determine a required material availability date necessary to satisfy the requested delivery date for the order based on constraints of the plurality of possible shipping locations, wherein the constraints include product availability, operating hours and delivery date;
   checking a material availability date for the order for at least a subset of the plurality of possible shipping locations in a defined order of shipping locations based on at least one of cost, proximity, and operating hours, the material availability date of a location defined as the date the order is physically capable of being shipped from the location;
   confirming fulfillment of the order from one of the plurality of shipping locations upon determination that the material availability date is the same date as the date on which the order was received, the material availability date meets the requested delivery date taking into account transportation time, and the material availability date is within operating hours of the one shipping location;
   calculating a shipping schedule to determine the material availability date for the order based on a second shipping location when fulfillment is not confirmed from a first shipping location; and
   confirming fulfillment of the order from a second shipping location upon determination that the material availability date is the same date as the date on which the order was received, the material availability date meets the requested delivery date taking into account transportation time, and the material availability date is within operating hours of the second shipping location.

2. The machine readable medium of claim 1, having further instructions stored therein, which when executed cause the machine to perform a further set of operations comprising:
   moving the material availability date to the date of receiving the order upon determining that the material availability date is in the future.

3. The machine readable medium of claim 1, having further instructions stored therein, which when executed cause the machine to perform a further set of operations comprising:
   moving the material availability date to a present or future time within working hours of the one shipping location.

4. The machine readable medium of claim 1, wherein it is more costly to ship from the second shipping location to a requestor than the first shipping location.

5. The machine readable medium of claim 1, having further instructions stored therein, which when executed cause the machine to perform a further set of operations comprising:
   determining a schedule to deliver the order from the one shipping location.

6. The machine readable medium of claim 5, having further instructions stored therein, which when executed cause the machine to perform a further set of operations comprising:
   performing an available to promise operation on the schedule.

7. The machine readable medium of claim 1, wherein calculating the schedule includes determining a transportation time from the one shipping location to a requestor.

8. The machine readable medium of claim 1, having further instructions stored therein, which when executed cause the machine to perform a further set of operations comprising:
   confirming a first shipping location to fulfill the order upon confirming a material availability date after the date of receiving the order and only after confirming an inability by any other shipping location to fulfill the requested delivery day with a material availability date on a day the order is received.

9. The machine readable medium of claim 1, having further instructions stored therein, which when executed cause the machine to perform a further set of operations comprising:
   checking material availability for an order for the plurality of shipping locations in a defined order of shipping locations.

10. The machine readable medium of claim 1, having further instructions stored therein, which when executed cause the machine to perform a further set of operations comprising:
   altering a first criteria to a second criteria in determining material availability; and
   rechecking material availability at a first location based on the second criteria.

* * * * *